United States Patent [19]

Hang

[11] Patent Number: 4,986,789
[45] Date of Patent: Jan. 22, 1991

[54] SHAPE IDENTIFICATION TOY VEHICLE ASSEMBLY

[76] Inventor: Hoi L. R. Hang, 913 King's Road, 6th Floor, North Point, Hong Kong

[21] Appl. No.: 382,132

[22] Filed: Jul. 20, 1989

[30] Foreign Application Priority Data

Jul. 21, 1988 [GB] United Kingdom ............... 8817388

[51] Int. Cl.[5] .................... A63H 17/00; A63H 33/04; A63H 33/08; A63H 17/26
[52] U.S. Cl. ....................................... 446/93; 446/117; 446/127; 446/470; 434/259
[58] Field of Search .................. 434/259, 403; 446/93, 446/94, 95, 96, 88, 117, 125, 470, 471, 469, 465, 431, 289, 290, 291

[56] References Cited

U.S. PATENT DOCUMENTS

| 1,877,661 | 9/1932 | Heisler et al. | 446/95 |
|---|---|---|---|
| 2,747,324 | 5/1956 | Zalkind | 434/259 X |
| 3,611,618 | 10/1971 | Steiner | 446/95 |
| 4,349,984 | 9/1982 | Goldfarb et al. | 446/93 |
| 4,437,668 | 3/1984 | Simpson et al. | 434/259 X |
| 4,466,215 | 8/1984 | Hanazato | 446/471 X |
| 4,610,637 | 9/1986 | Ferguson | 434/259 X |
| 4,631,040 | 12/1986 | Shiraishi | 446/94 X |
| 4,684,355 | 8/1987 | Urakawa et al. | 446/95 X |
| 4,698,023 | 10/1987 | Marino | 434/259 |

FOREIGN PATENT DOCUMENTS

| 0085542 | 8/1983 | European Pat. Off. | 446/93 |
|---|---|---|---|
| 2468393 | 5/1981 | France | 446/465 |
| 2616082 | 12/1988 | France | 446/93 |
| 419311 | 5/1933 | United Kingdom . | |
| 920534 | 3/1963 | United Kingdom | 446/470 |
| 1357517 | 4/1973 | United Kingdom . | |
| 1559143 | 8/1977 | United Kingdom . | |
| 2042912 | 10/1980 | United Kingdom | 434/259 |
| 2207364 | 2/1989 | United Kingdom | 446/93 |

OTHER PUBLICATIONS

"Shape Stack", Cleo Learning Aids, 2-76, p. 175.

Primary Examiner—Robert A. Hafer
Assistant Examiner—D. Neal Muir
Attorney, Agent, or Firm—Finnegan, Henderson, Farabow, Garrett and Dunner

[57] ABSTRACT

A toy vehicle constructed as a shape identification toy, wherein the toy vehicle comprises a plurality of components which interconnect due to a shaped member being provided on one of the plurality of components co-operating with a corresponding shaped member provided on another of the plurality of components.

10 Claims, 3 Drawing Sheets

SHAPE IDENTIFICATION TOY VEHICLE ASSEMBLY

BACKGROUND OF THE INVENTION

The present invention relates to a combined shape identification toy and toy vehicle.

There are many toy vehicles per se known, and also many shape identification toys per se known. Such toys, however, provide only a single function, and for young children it is difficult to maintain their interest in a shape identification toy as opposed to for instance toy vehicles.

SUMMARY OF THE INVENTION

In accordance with the present invention, a toy vehicle is constructed as a shape identification toy.

Such an arrangement is particularly advantageous for young children, in that it serves to teach a child to recognize shapes without losing the interest of the child, since the toy also functions as a movable vehicle.

Preferably, the toy vehicle comprises a plurality of components which interconnect due to shaped members being provided on one or more of the plurality of components.

Suitably, the toy vehicle is a car having at least three components, a first component being the base of the car with wheels, the second component being the main body of the car, and the third component being the roof portion of the car. The lower part of the roof portion and the upper part of the body portion are provided with matching shaped members. Preferably, the body portion of the car is sub-divided into two parts, and a shaped member provided on the lower part of the upper body portion which corresponds to a shaped member on the upper part of the lower portion of the car.

Such a combined toy vehicle and shape identification toy is simple in design and construction yet effective in educating a child whilst not losing their attention.

DESCRITION OF THE PREFERRED EMBODIMENTS

Figure 1:
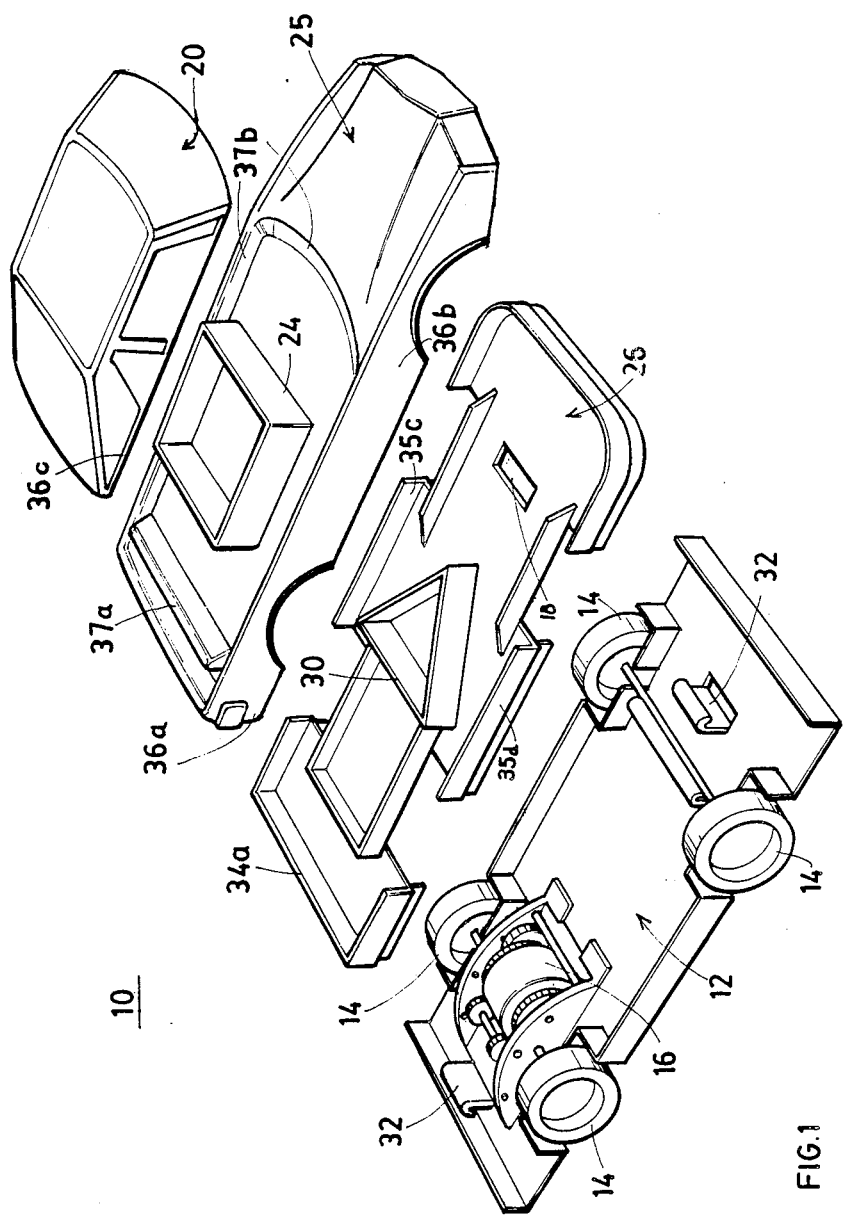
FIG. 1 is a perspective view of a vehicle in accordance with the invention shown in exploded form.
Figure 2:
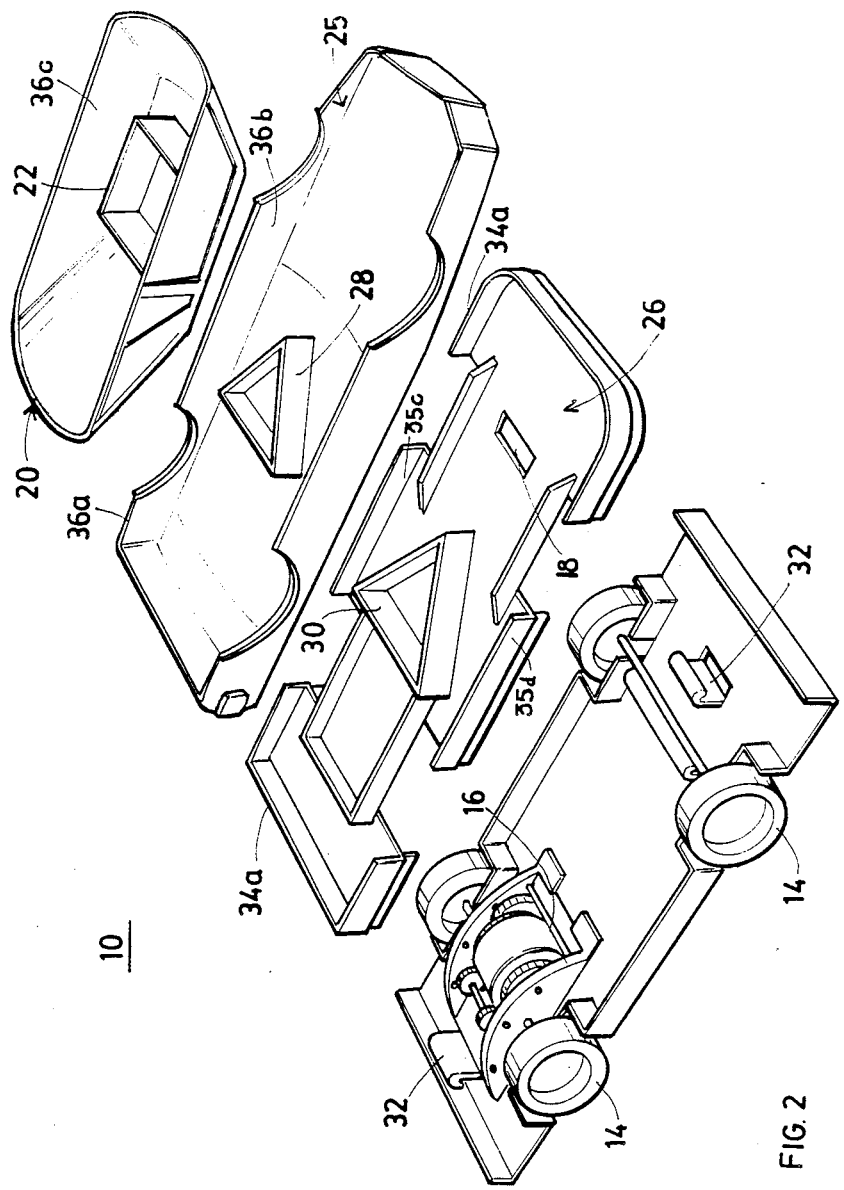
FIG. 2 is a perspective view of the vehicle shown in FIG. 1 in an alternative exploded arrangement.

In FIGS. 1 and 2, a combined toy car and shape identification toy 10 is shown having a base portion 12 with wheels 14 and a motor 16, an upper body portion 25 and a lower body portion 26 and a roof portion 20. The underneath of the roof portion is provided with a downward extending square identification member 22 which matches and fits within a corresponding upstanding square identification member 24 on the upper part 25 of the body portion.

The body portion is split into two portions 25 and 26, and the underneath of the upper body portion 25 is provided with a triangular shaped identification member 28 (see FIG. 2) which matches and fits into a corresponding triangular shaped identification member 30 on the upper part of the lower body portion 26 (see FIGS. 1 and 2).

The base portion 12 is also provided with clip means 32 which engages an edge of opening 18 in the lower body portion 26 to secure the two parts together.

The motor 16 is suitably a "stored energy" motor which is wound up such that on release of the car by a child, the car moves off at speed.

The components 25, 26 and 20 apart from interconnecting via the shaped members, are also designed such that an upper member snugly fits within a lower member. In particular the lower member is provided with an outer upstanding wall such as wall 34a at the rear of body member 26 and 34b adjacent the rear of body member 25, for example, also upstanding walls 35 (c) and 35 (d) are disposed on opposite sides of lower body member 26. Walls 34 (a), 35 (c) and 35 (d) engage, the inner side of the lower downwardly extending walls 36 (a), and 36 (b) and 36 (c) of the upper members.

Similarly, upwardly extending walls, such as 37 (a) and 37 (b) engage the inner sides of downwardly extending walls such as 36 (c).

Figure 3:
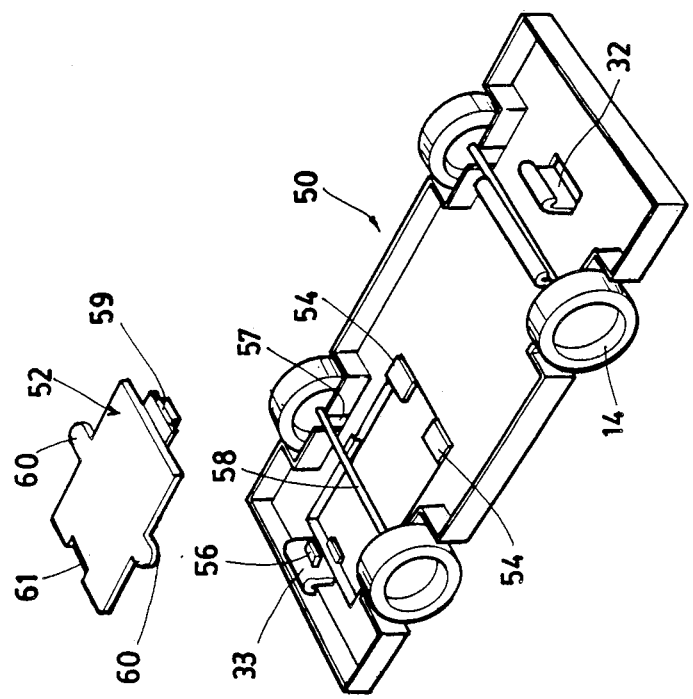
FIG. 3 is a perspective view of a portion of an embodiment of vehicle in accordance with the invention shown in exploded form.

In FIG. 3, a base portion 50 of another car embodiment is shown which is similar to the base portion 12 of the car 10 with the motor 16 removed. Additionally, a plate member 52 is povided which is placed under two front lug members 54 and one rear lug member 56 (movable since it is mounted on clip 33), in order to retain in place within holes 57 in the side of the base portion 50 the rear axle 58 of the car. The plate member 52 is provided with a forward lug 59 which co-operates with the underneath of the lugs 54, a recess 61 provided at the rear in which the lug 56 is positioned, and two side lugs 60 in order to space apart the two rear wheels. This embodiment is easily converted from such a "free wheeling arrangement" to a "motorized arrangement" by removal of the plate member 52, and insertion of a motor such as that shown in FIGS. 1 and 2. Conversely, the embodiment is easily convertible by using the plate member 52 back to its "free wheeling arrangement" shown partly exploded in FIG. 3.

The various portions of the car interconnect in order to provide a toy car which can function as an ordinary toy car.

The arrangement is such that the toy car also acts as a shape identification toy, and for young children their attention is ratained whilst putting the car together, since the toy car is movable. Since the child's attention is retained, the child is taught shape identification.

As will be appreciated, the shaped identification members can be of any shape, for example round, rectangular, oval etc. Furthermore as can be appreciated, the toy vehicle can be a truck, bus, aeroplane, boat, or the like.

I claim:

1. A shape identification toy having at least three separable interfitting component parts stackable one on top of the other in a predetermined sequence and orientation the toy comprising:

a first component means including a first elongated component having an outer perimeter configuration in the form of a base of a toy vehicle and including a portion intended to movably engage a playing surface, the first component means including an upper face having interfitting connectable means of a first predetermined shape for removably receiving a second component means on the upper face of the first component means;

a second component means, including at least one second elongated component having an outer perimeter configuration in the form of a portion of a body of the toy vehicle, the at least one second elongated component of the second component means including a lower face having interfitting connectable means of a predetermined shape for removably receiving the connectable means of the first elongated component of the first component means at time when the second component means is stacked on the first component means in a predetermined orientation with the lower face of the at least one second elongated component of the second component means opposing the upper face of the first elongated component of the first component means, the at least one second elongated component having an upper face with an interfitting connectable means of a second identifiable shape different from the first predetermined shape for removably receiving a third component means having an interfitting connectable means corresponding to the second identifiable shape;

a third component means, including a third elongated component having an outer perimeter configuration in the form of a roof portion of the toy vehicle, the third component means including the third elongated component having a lower face with a first interfitting connectable means of an identifiable shape for removably receiving the connectable means with the second identifiable shape at times when the third elongated member of the third component means is stacked on the second component means in a predetermined orientation with the lower face of the elongated component of the third component means opposing the upper face of the at least one elongated component of the second component means, the first, second and third component means forming a complete integral toy vehicle when stacked one on top of the other in said predetermined orientation.

2. The toy of claim 1 wherein the at least one component of the second component means includes a first component part and a second component part each having opposing face portions with separable interfitting connectable means of a fourth identifiable shape, outer perimeters of the first and second component parts forming upper and lower portions of a body of the toy vehicle.

3. The toy of claim 1 wherein the interfitting connectable means of the first shape includes securing means for fastening the first component means to the second component means when in the predetermined orientation.

4. The toy as claimed in claim 3 wherein said securing means is a clip insertable into an aligned opening.

5. The toy as claimed in claim 3 wherein said securing means include wall members in snug physical engagement with one another.

6. The toy of claim 1 wherein the connectable means of the first, second, and third component means include wall projections disposed to slidably engage opposing wall projections when the first, second, and third component means are in a predetermined orientation.

7. The toy of claim 2 wherein the identifiable shapes include a rectangle and triangle.

8. The toy as claimed in claim 1 further comprising securing means for securing together two of said component means when said connectable means on one of said component means cooperates with said corresponding connectable means on another of said component means.

9. The toy as claimed in claim 1 wherein the first component means includes a plurality of wheels and the elongated component of the first component means has an opening between the wheels for receiving and mounting a toy driving motor.

10. The toy as claimed in claim 9 further comprising a plate member mountable in the opening for supporting the wheels at times when the first component means is without a toy driving motor.

* * * * *